Patented Nov. 3, 1953

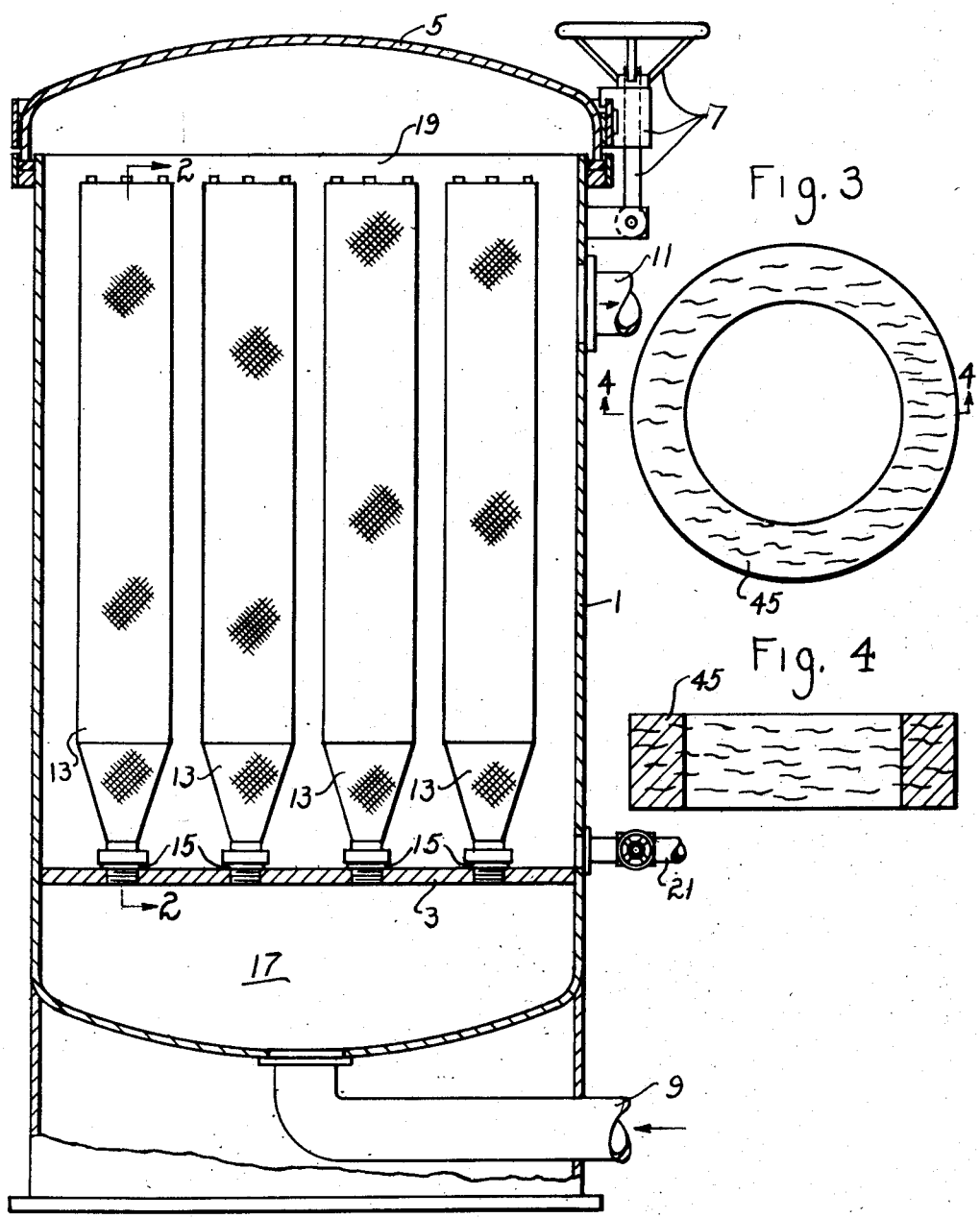

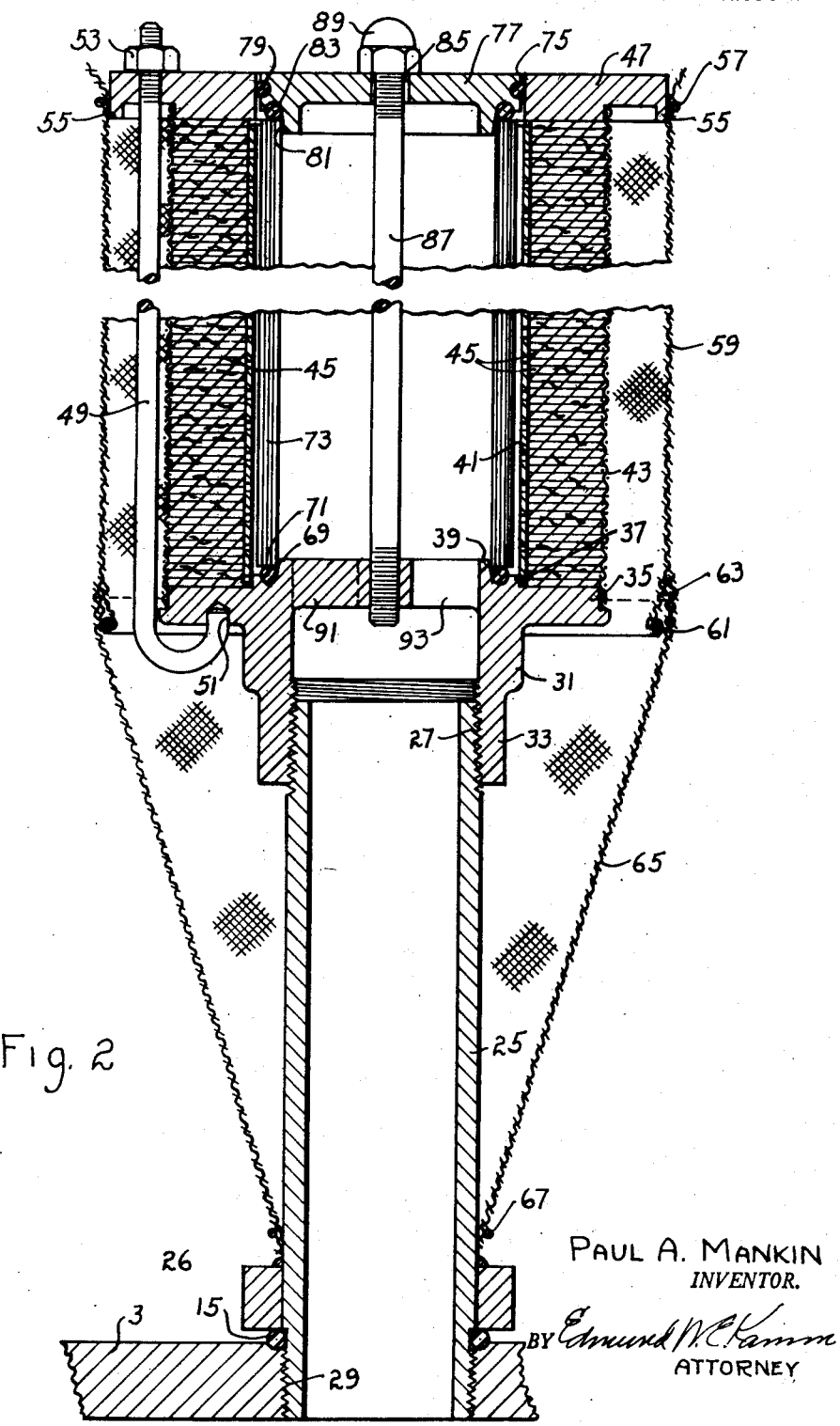

2,657,808

UNITED STATES PATENT OFFICE 2,657,808

WATER SEPARATOR

Paul A. Mankin, Fort Wayne, Ind., assignor to Bowser, Inc., Fort Wayne, Ind., a corporation of Indiana Application October 12, 1950, Serial No. 189,694

15 Claims. (Cl. 210—184)

This invention relates to a water separator. More specifically, it relates to a separator for removing water entrained in aviation fuels.

It is a well known fact that water contained in aviation fuels becomes ice at the low temperatures encountered at high altitudes. The ice accumulates at various points in the fuel system of an aircraft and interference with the flow of fuel therethrough.

It is an object of the invention to provide means for removing the water from the fuel at the fueling station.

Another object of the invention is to provide means for providing a separation unit which treats the fuel in several stages.

A further object of the invention is to provide a water separation element in which the fuel and water are, successively passed through a cellulose cartridge, a cartridge of glass wool and the final separation of the water is affected by a cloth.

A further object of the invention is to provide a first stage separator and filter of cellulose and a second stage separator of glass fiber.

Yet another object of the invention is to provide a two stage separator of cellulose and glass fibers in which the cellulose is removable as a unit for replacement.

Another object is to provide a separator which is compact.

Still another object is to provide a separator which is easily manufactured.

These and other objects will become apparent from a study of this specification and the drawings which are attached hereto and are made a part hereof and in which:

Figure 1 is a vertical sectional view of the separator tank with the separator units in place therein.

Figure 2 is a vertical sectional view of a separator unit taken substantially on the line 2—2 of Figure 1.

Figure 3 is a plan view of a glass fiber lamination.

Figure 4 is a sectional view of the lamination taken substantially on line 4—4 of Figure 3.

This invention is an improvement on the invention, which is disclosed in the application of Harvey E. Marvel, Serial No. 181,391, filed August 25, 1950 for Water Fuel Separator.

Referring to the drawings, the numeral 1 represents a tank having a deck plate 3 mounted therein, a cover 5 removably mounted thereon and clamping means 7 for holding the cover in sealing relation on the tank. An inlet conduit 9 is connected at one end with the tank below the deck plate and at the other end with a pump or other source of fuel under pressure (not shown). An outlet conduit 11 communicates with the tank above the deck plate and serves to carry the clean, dehydrated fuel from the separator.

A number of separator units 13 are screwed into the deck plate 3 so as to receive the inflowing fuel and gaskets 15 prevent the leakage of untreated fuel from the inlet compartment 17 to the treated fuel compartment 19. A valved, suitable water drain 21 is provided at the bottom of compartment 19 just above the deck plate 3.

Figure 2 shows the separating unit 13 in detail. The unit comprises a nipple 25 which is threaded at each end at 27 and 29 and provided with a collar 26 welded to the nipple adjacent the lower thread 29 which is received in the deck plate 3.

A bottom head 31 is provided with a threaded boss 33 which receives the threads 27. The head is provided with a series of concentric circular bosses 35, 37 and 39 on its upper face.

A cylinder 41 of perforated metal is fitted over the boss 37 while a cylinder of screen wire 43 is fitted over boss 35. A number of annular laminations 45 of glass fiber material, which is preferably lightly bonded with a phenol formaldehyde resin which has been polymerized to render it insoluble, are inserted between the two cylinders and are compressed therein by the top head 47. The laminations are shown in detail in Figures 3 and 4 and are preferably made from a pad having a thickness of about one inch. These are then compressed to a thickness of about 1/20 of an inch.

This compression is maintained by the hook-bolts 49 which are entered in blind holes or depressions 51 formed in the lower head and are passed through holes in the top head where they are held in place by nuts 53.

The upper head extends outwardly beyond the cylinder 43 and is provided with a down turned flange 55 to which is attached by a wire or other band 57 a cylindrical cloth bag 59 which has a circular wire 61 set in a hem 63 formed at the bottom of the bag. A conical bag 65 is fixed to the bag 59 adjacent the hem and tapers downwardly to a point adjacent the collar where it is bound to the nipple 25 by a wire or other band 67. The cloth is preferably linen.

The boss 39 is preferably conical, converging upwardly, and terminates at its lower end in a seat 69 which is adapted to receive the gasket 71.

A cellulose cartridge 73 which is made of phenol formaldehyde resin impregnated paper wound into a convolute roll, so that the resin on adjacent layers is merged, and which is thereafter baked to polymerize the resin, is mounted on the boss and gasket. The paper is only lightly impregnated with resin to afford little reduction of porosity. This cartridge is fully disclosed in the patent issued to Frank B. Harvuot, No. 2,584,387, issued February 5, 1952.

The top head is provided with a circular, central opening 75 therein which has a diameter greater than that of the cartridge. A plug 77 is slidably mounted therein and has a seal 79 disposed on its periphery to engage the wall of said opening to seal it.

The plug is also provided with a depending, downwardly converging tapered wall 81 which has a seat for a gasket 83 formed at its base. The wall and the gasket both engage the cartridge to center and seal it.

An opening 85 is formed in the plug to receive the rod 87 which is threaded at both ends. An acorn nut 89 is mounted on the upper end of the rod to seal the hole 85 while the lower end of the rod is screwed into a tapped hole in the web 91. Ports or openings 93 are formed in the lower head so that liquid rising in the nipple will enter the interior of the cartridge.

OPERATION

The fuel and water mixture is delivered under pressure from the pump or other source through the conduit 9 into the chamber 17 whence it flows through the deck plate, nipples 25 and ports 93 to the interior of the cartridge 73. The seal rings 15, 71, 83 and 79 prevent the untreated fluid from flowing into the compartment 19 without passing through the treating bodies.

The liquid flows through the cartridge, which performs the dual functions of coalescing minute particles of entrained water into somewhat larger particles and of removing solids, including particles of micronic size from the liquid. It has also been found from tests that gums which form in gasolines are removed in this cartridge.

After passing through the cartridge, the liquid passes through cylinder 41, and through the glass fiber pack 45 where the water particles coalesce into large drops of water which form on the exterior of the cylinder 43 and then drop by gravity, downwardly between the bags 59, 65 and the remainder of the unit.

The treated fuel passes out through the bag 59 into the compartment 19 while the water finally pours, usually in a stream, through the cone 65 at or adjacent the lower end thereof, and collects adjacent the deck plate 3 where it may be removed through the drain 21.

When the cartridge 73 becomes clogged, the nut 89 is removed and plug 77 is withdrawn. This releases the cartridge 73 which may then be lifted out of the unit and a new one installed in its place. Thereafter the plug 77 and nut 89 are replaced.

The conical bosses 39 and 81 serve to center the cartridge and also, since they engage the inner edges of the cartridge they assist in sealing it.

As stated above, this cartridge serves both to protect the glass fiber pack from dirt and gum so as to greatly extend the life thereof and it also serves to partially coalesce the water particles.

Should the fiber glass pack become ineffective, it can be replaced by first removing the entire unit from the deck plate and tank, removing plug 77 and cartridge 73, removing the band 57 and dropping the bag 59. The nuts 53 can be loosened and the head 47 removed. This frees the cylinders 41 and 43 so that they and the pack contained therein can be removed and replaced by a new element or the old pack may be removed from the cylinders and a new set of laminations may be installed.

The pack when it is not confined at the ends expands beyond the cylinders. It is held compressed between the heads by the bolts 49 and a seal between the pack and heads is thus assured.

Thereafter, the unit is reassembled in an obvious manner.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a fuel and water separator comprising a tank, a deck plate mounted in the tank to separate into first and second compartments, a supply conduit communicating with the first compartment, a water separating unit mounted on the deck plate within the second compartment and having an inlet communicating with the first compartment, said unit comprising means including a first water coalescing member disposed to intercept the liquid flowing through said inlet, means including a second coalescing member disposed to intercept effluent from said first element and means including a separator for intercepting the effluent from said second member, said second compartment serving to collect the effluent from said separator, and separate fuel and water outlet conduits communicating with said second compartment.

2. The structure defined by claim 1 wherein the first coalescing member is constructed of cellulose and has a fine, porous structure which produces micronic filtration.

3. The structure defined by claim 1 wherein the first coalescing member is constructed of cellulose which is impregnated with a polymerized phenol formaldehyde resin.

4. The structure defined by claim 1 wherein the first coalescing member is constructed of cellulose impregnated with a water and fuel insoluble resin.

5. The structure defined by claim 1 wherein the second coalescing member is constructed of compressed glass fibers and a bonding medium for bonding the fibers together.

6. The structure defined by claim 1 wherein the second coalescing member is constructed of compressed glass fibers impregnated with a resin which is substantially insoluble in fuel and water.

7. The structure defined by claim 1 wherein the second coalescing member is constructed of a compressed glass fiber mat impregnated with a polymerized phenol formaldehyde resin.

8. The structure defined by claim 1 wherein the separator is made of cloth.

9. A water and fuel separating unit comprising an inlet conduit, a pair of spaced heads, a hollow pack of water coalescing material compressed between said heads, a seat formed on one head within the bore of the pack, means defining an opening in the other head communicating with the bore of the pack, a rigid filtering and coalescing cartridge mounted within the bore of the pack with one end in sealing relation with said seat closure means on the other head for closing said opening, means on said one head and closure for holding said cartridge out of contact with said pack, and additional seat means on said closure means for sealing the other end of said cartridge.

10. A water and fuel separating unit comprising an inlet conduit, a pair of spaced heads, a hollow pack of water coalescing material compressed between said heads, a seat formed on one head within the bore of the pack, means defining an opening in the other head communicating with the bore of the pack, a rigid cartridge mounted within the bore of the pack and in spaced relation therewith with one end in sealing relation with said seat, closure means on the other head for closing said opening, additional seat means on said closure for sealing the other end of said cartridge, a separator bag attached to the uppermost head and enclosing said pack and means for holding said separator bag in spaced relation with respect to said pack.

11. A water and fuel separating unit comprising an inlet conduit, a pair of spaced heads, a hollow pack of water coalescing material compressed between said heads, tapered, centering boss means terminating in an annular seat formed on one head within the bore of the pack, means defining an opening in the other head communicating with the bore of the pack, a rigid, cylindrical coalescing and filtering cartridge mounted within the bore of the pack with one end centered on said boss and in sealing relation with said seat, closure means comprising a plug slidably mounted in said opening, tapered, centering boss means terminating in an annular seat, formed on said plug for centering and sealing the other end of said cartridge, and means for moving said seat means relatively toward each other to compress the cartridge therebetween.

12. A water and fuel separating unit comprising a pair of spaced heads, a hollow, pervious pack of water coalescing material comprised between said heads, a rigid, hollow, pervious, coalescing and micronic filtering cartridge, means for removably mounting said cartridge within the bore of said pack in spaced relation with respect thereto, means for sealing the ends of the cartridge and an inlet conduit communicating with the bore of said cartridge, a pervious bag and means for supporting said bag to enclose the pack in spaced relation with respect thereto.

13. A water and fuel separating unit comprising a pair of spaced heads, a hollow, pervious pack of water coalescing material disposed between said heads, a pair of concentric foraminous walls for containing the pack, a rigid, hollow, pervious, coalescing and micronic filtering cartridge removably mounted within the bore of said pack, means for centering said cartridge within the bore, out of contact with said walls and pack, means for sealing the ends of the cartridge and an inlet conduit communicating with the bore of said cartridge.

14. A water and fuel separating unit comprising a pair of spaced heads, a hollow, pervious pack of water coalescing material disposed between said heads, means for compressing said heads toward the pack, a hollow, rigid, pervious, coalescing and micronic filtering cartridge disposed in the bore of the pack in spaced relation therewith, means for sealing the ends of said cartridge, an inlet pipe extending from one head and communicating with the interior of the cartridge, the other head comprising means extending outwardly beyond the pack, a bag supported in sealing relation on said head, extending around and past said pack and pipe in spaced relation with respect thereto and means for sealingly attaching said bag to said pipe.

15. A water and fuel separating unit comprising a pair of spaced heads, a hollow pervious pack of water coalescing material disposed between said heads, means for compressing said heads toward the pack, a hollow, rigid, pervious filter cartridge disposed in the bore of the pack, means on one head comprising tapered boss means terminating in a seat, a closure member removably mounted on the other head having tapered boss means terminating in a seat, said boss means serving to hold the cartridge in the hollow of the pack and in spaced relation thereto, means for holding said seats in sealing relation with the cartridge, an inlet pipe extending from said one head and communicating with the interior of the cartridge, said other head comprising means extending outwardly beyond the pack, a bag supported in sealing relation on said other head, extending around and past said pack and pipe and means for sealingly attaching said bag to said pipe.

PAUL A. MANKIN.

References Cited in the file of this patent

UNITED STATES PATENTS

| Number | Name | Date |
|---|---|---|
| 994,377 | Cottrell | June 6, 1911 |
| 1,179,157 | Braun | Apr. 11, 1916 |
| 1,218,738 | Zahm | Mar. 13, 1917 |
| 1,642,864 | Williams | Sept. 20, 1927 |
| 1,710,758 | Wright | Apr. 30, 1929 |
| 1,787,577 | Hills | Jan. 6, 1931 |
| 1,823,171 | Hele-Shaw et al. | Sept. 15, 1931 |
| 1,947,709 | Garrison et al. | Feb. 20, 1934 |
| 2,103,572 | Wills | Dec. 28, 1937 |
| 2,196,821 | Arnold | Apr. 9, 1940 |
| 2,422,647 | Vokes | June 17, 1947 |
| 2,584,387 | Harvuot | Feb. 5, 1952 |

FOREIGN PATENTS

| Number | Country | Date |
|---|---|---|
| 16,729 | Great Britain | A. D. 1894 |
| 11,700 | Great Britain | A. D. 1897 |
| 492,956 | Great Britain | Sept. 26, 1938 |